US010803718B2

(12) United States Patent
Sankey (10) Patent No.: US 10,803,718 B2
(45) Date of Patent: Oct. 13, 2020

(54) SYSTEMS AND METHODS FOR REMOTELY CONTROLLING SECURITY DEVICES

(71) Applicant: InVue Security Products Inc., Charlotte, NC (US)

(72) Inventor: James K. Sankey, Charlotte, NC (US)

(73) Assignee: Huawei Technologies Co., Ltd, Shenzhen (CN)

( * ) Notice: Subject to any disclaimer, the term of this patent is extended or adjusted under 35 U.S.C. 154(b) by 0 days.

(21) Appl. No.: 15/112,230

(22) PCT Filed: Jan. 8, 2015

(86) PCT No.: PCT/US2015/010576
§ 371 (c)(1),
(2) Date: Jul. 18, 2016

(87) PCT Pub. No.: WO2015/112336
PCT Pub. Date: Jul. 30, 2015

(65) Prior Publication Data
US 2016/0335859 A1    Nov. 17, 2016

Related U.S. Application Data

(60) Provisional application No. 61/930,039, filed on Jan. 22, 2014.

(51) Int. Cl.
*G05B 15/02* (2006.01)
*G08B 13/14* (2006.01)
(Continued)

(52) U.S. Cl.
CPC .......... *G08B 13/1445* (2013.01); *A47F 7/024* (2013.01); *G05B 15/02* (2013.01); *G06Q 30/00* (2013.01); *G08B 13/1409* (2013.01)

(58) Field of Classification Search
CPC . G08B 13/1445; G08B 13/1409; A47F 7/024; G05B 15/02; G06Q 30/00
(Continued)

(56) References Cited

U.S. PATENT DOCUMENTS 2,873,822 A    2/1959 Sloan
4,069,919 A    1/1978 Fernbaugh
(Continued)

FOREIGN PATENT DOCUMENTS

CN    101030314 A    9/2007
CN    101583984    11/2009
(Continued)

OTHER PUBLICATIONS

Extended European Search Report from corresponding European Application No. 15740036.7, dated Feb. 2, 2017 (6 pages).
(Continued)

*Primary Examiner* — Hai Phan
*Assistant Examiner* — Anthony D Afrifa-Kyei
(74) *Attorney, Agent, or Firm* — Slater Matsil, LLP (57) ABSTRACT

Embodiments of the present invention are directed to systems and methods for displaying and securing articles of merchandise. In one example, a merchandise security system includes a plurality of security devices, wherein each of the security devices includes a sensor configured to be attached to an article of merchandise. Each of the security devices further includes a base for removably supporting the sensor and the article of merchandise thereon. The system also includes a controller in communication with each of the security devices, wherein the controller is configured to communicate with a remote device to lock at least one of the security devices such that the article of merchandise and the sensor cannot be removed from the base.

66 Claims, 3 Drawing Sheets

(51) Int. Cl.
  *A47F 7/024* (2006.01)
  *G06Q 30/00* (2012.01)
(58) Field of Classification Search
  USPC ............ 340/568.8, 571, 572.1, 572.2, 572.3, 340/572.4, 572.5, 572.6, 572.7, 572.8, 340/572.9
  See application file for complete search history.

(56) References Cited

U.S. PATENT DOCUMENTS

| | | | |
|---|---|---|---|
| 4,305,266 | A | 12/1981 | Lockwood |
| 5,392,025 | A | 2/1995 | Figh et al. |
| 7,024,356 | B2 | 4/2006 | Yasunaga et al. |
| 7,701,339 | B2 | 4/2010 | Irmscher et al. |
| 8,102,262 | B2 | 1/2012 | Irmscher et al. |
| 8,405,507 | B2 | 3/2013 | Belden, Jr. et al. |
| 8,941,467 | B2 | 1/2015 | Jankowski et al. |
| 9,353,552 | B1 | 5/2016 | Kelsch et al. |
| 9,443,404 | B2 | 9/2016 | Grant et al. |
| 9,747,765 | B1 | 8/2017 | Berglund et al. |
| 9,761,101 | B2 | 9/2017 | Berglund et al. |
| 9,805,564 | B1 | 10/2017 | Berglund et al. |
| 9,811,988 | B2 | 11/2017 | Grant et al. |
| 9,928,704 | B2 | 3/2018 | Berglund et al. |
| 10,043,358 | B1 | 8/2018 | Berglund et al. |
| 10,127,745 | B2 | 11/2018 | Grant et al. |
| 10,210,681 | B1 | 2/2019 | Grant et al. |
| 10,258,172 | B2 | 4/2019 | Grant et al. |
| 10,290,192 | B2 | 5/2019 | Grant et al. |
| 10,347,061 | B2 | 7/2019 | Grant et al. |
| 10,475,308 | B2 | 11/2019 | Grant et al. |
| 10,529,201 | B2 | 1/2020 | Grant et al. |
| 2006/0208908 | A1 | 9/2006 | Skjellerup et al. |
| 2007/0205902 | A1* | 9/2007 | Cote .................. E05B 73/0017 340/572.9 |
| 2007/0296545 | A1* | 12/2007 | Clare ................. G07C 9/00571 340/5.64 |
| 2008/0142665 | A1 | 6/2008 | Belden et al. |
| 2008/0168806 | A1 | 7/2008 | Belden et al. |
| 2009/0027161 | A1 | 1/2009 | Kent |
| 2010/0176945 | A1 | 7/2010 | Fawcett et al. |
| 2010/0231388 | A1* | 9/2010 | Shute .................. E05B 73/0017 340/568.4 |
| 2011/0062294 | A1 | 3/2011 | Johnson et al. |
| 2011/0187531 | A1* | 8/2011 | Oehl .................. G08B 13/1445 340/568.1 |
| 2011/0254661 | A1* | 10/2011 | Fawcett ............. G08B 13/1445 340/5.61 |
| 2011/0309934 | A1 | 12/2011 | Henson et al. |
| 2012/0144882 | A1* | 6/2012 | Shute .................. E05B 73/0017 70/14 |
| 2012/0188082 | A1 | 7/2012 | Berglund et al. |
| 2012/0253508 | A1 | 10/2012 | Holmes |
| 2012/0293330 | A1* | 11/2012 | Grant ................. G08B 21/0266 340/568.8 |
| 2013/0026322 | A1 | 1/2013 | Wheeler et al. |
| 2013/0238516 | A1* | 9/2013 | Moock ................ G06Q 30/018 705/317 |
| 2013/0268316 | A1 | 10/2013 | Moock et al. |
| 2014/0118930 | A1 | 5/2014 | Sedon |
| 2014/0328020 | A1 | 11/2014 | Galant |
| 2014/0366164 | A1* | 12/2014 | Hoefgen ................. G06F 21/88 726/34 |
| 2015/0091729 | A1* | 4/2015 | Phillips .............. G08B 13/1427 340/568.2 |
| 2015/0324538 | A1* | 11/2015 | Hyde .................. G06F 19/3418 700/90 |
| 2016/0049056 | A1* | 2/2016 | Grant ................. G08B 13/2405 340/572.1 |
| 2018/0061197 | A1 | 3/2018 | Grant et al. |
| 2019/0208926 | A1 | 7/2019 | Grant et al. |
| 2019/0272689 | A1 | 9/2019 | Grant et al. |

FOREIGN PATENT DOCUMENTS

| | | |
|---|---|---|
| CN | 203070451 U | 7/2013 |
| GB | 2363422 A | 12/2001 |
| WO | 2001/020413 A1 | 3/2001 |
| WO | 2001097661 A1 | 12/2001 |
| WO | 2012/116037 A1 | 8/2012 |
| WO | 2014019072 A1 | 2/2014 |
| WO | 2014078966 A1 | 5/2014 |

OTHER PUBLICATIONS

Shane Thomas, Notification of Transmittal of the International Search Report and the Written Opinion of the International Searching Authority, or the Declaration for International (PCT) Application No. PCT/US2015/010576, Apr. 16, 2015, 9 pages, Alexandria, Virginia.
CPI inTouch Security System Door Locks webpage, Jan. 21, 2014, 2 pages (see www.cpisecurity.com/home-security/features/doorlocks).
InVue High Security 200 Handheld & Tablet Power-Up + Alarm Installation MP602, 2013, 15 pages, Charlotte, North Carolina.
International Search Report and Written Opinion from related International Application No. PCT/US2015/046684, dated Dec. 7, 2015 (9 pages).
Extended European Search Report from related EP Application No. 15835389.6, dated Feb. 19, 2018 (7 pages).
U.S. Appl. No. 15/957,519, filed Apr. 19, 2018.
"MTI Freedom LP3 Brochure," Mobile Technologies, Inc., dated Sep. 2009 (1 page).
"MTI Freedom LP3 Product Manual," Mobile Technologies, Inc., dated Mar. 2010 (20 pages).
"MTI Freedom LP3 Product Manual," Mobile Technologies, Inc., dated Mar. 2011 (25 pages).
"MTI Freedom LP3 Quick Reference Guide," Mobile Technologies, Inc., dated Feb. 2010 (2 pages).
"MTI Freedom One Product Manual," Mobile Technologies, Inc., dated Jun. 2011 (32 pages).
"MTI Freedom One Product Manual," Mobile Technologies, Inc., dated Jun. 2012 (32 pages).
"MTI Freedom One Sell Sheet," Mobile Technologies, Inc., dated 2012 (2 pages).
Office Action from corresponding Chinese Patent Application No. 201580005517.2, dated Apr. 8, 2018 (8 pages).
U.S. Appl. No. 16/733,953, filed Jan. 3, 2020.
U.S. Appl. No. 16/815,566, filed Mar. 11, 2020.
Summons to attend Oral Proceedings from corresponding European Patent Application No. 15740036.7, dated Dec. 21, 2018 (4 pages).

* cited by examiner

SYSTEMS AND METHODS FOR REMOTELY CONTROLLING SECURITY DEVICES

CROSS REFERENCE TO RELATED APPLICATION

The present application claims priority to U.S. Provisional Application No. 61/930,039, filed Jan. 22, 2014, the contents of which are incorporated by reference herein in their entirety.

FIELD OF THE INVENTION

Embodiments of the present invention relate generally to merchandise display systems and methods, in particular, to systems and methods for remotely controlling security devices used to display and secure merchandise.

BACKGROUND OF THE INVENTION

Retailers routinely display articles of merchandise, such as phones, portable computers (e.g. notebooks, laptops, tablets, etc.), e-readers, media players, and the like for customers to evaluate before making a purchase. These articles of merchandise are continually being made smaller and lighter in weight due to advances in technology and materials. As a result, such merchandise is increasingly vulnerable and susceptible to theft. At the same time, the retail price and profit margin for such merchandise continues to decline. Accordingly, these articles of merchandise need to be secured by a security device that effectively and cost efficiently protects the merchandise from theft.

It is common in the retail security industry to utilize security devices to secure electronic devices to a fixture to prevent theft yet allow a customer to interact with the device. However, difficulties arise when a retailer wishes to facilitate communication with a plurality of security devices or to provide additional security on demand in an efficient manner.

BRIEF SUMMARY

Embodiments of the present invention are directed to systems and methods for displaying and securing articles of merchandise. In one embodiment, a merchandise security system is provided. The merchandise security system includes a plurality of security devices, each of the security devices comprising a sensor configured to be attached to an article of merchandise and further comprising a base for removably supporting the sensor and the article of merchandise thereon. The merchandise security system also includes a controller in communication with each of the security devices, wherein the controller is configured to communicate with a remote device to lock at least one of the security devices such that the article of merchandise and the sensor cannot be removed from the base. In some cases, the communication between the controller and the remote device is wireless.

In another embodiment, a merchandise security system is provided and includes a plurality of security devices, each of the security devices comprising a sensor configured to be attached to an article of merchandise and further comprising a base for removably supporting the sensor and the article of merchandise thereon. The merchandise security system further includes a controller in communication with each of the security devices and a remote device configured to communicate with the controller. The controller is configured to communicate with the remote device to lock at least one of the security devices such that the article of merchandise and the sensor cannot be removed from the base.

In another embodiment, a method for displaying and securing articles of merchandise is provided. The method includes receiving a remote signal at a controller in communication with a plurality of security devices, each of the security devices comprising a sensor configured to be attached to an article of merchandise and further comprising a base for removably supporting the sensor and the article of merchandise thereon. The method further includes locking at least one of the security devices in response to the remote signal such that the article of merchandise and the sensor cannot be removed from the base.

In one embodiment, a merchandise security system is provided and includes a plurality of security devices, each of the security devices comprising a base for removably supporting an article of merchandise thereon, each of the security devices further comprising a locking mechanism configured to operably engage the article of merchandise. The merchandise security system also includes a controller in communication with each of the security devices. The controller is configured to communicate with a remote device for actuating at least one of the locking mechanisms such that the article of merchandise cannot be removed from the base.

DETAILED DESCRIPTION

Embodiments of the present invention will now be described more fully hereinafter with reference to the accompanying drawings, in which various embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout, and prime notation and multiple prime notations are used to indicate similar elements in alternative embodiments.

One or more embodiments of a system for securing an article of merchandise are described below and shown. The article of merchandise is typically a display model or an operational sample of electronic merchandise, such as portable telephones, smart phones, computers (e.g. notebooks, laptops, tablets, etc.), e-readers, media players, and the like, for a customer to examine before making a decision to purchase the item. The article of merchandise is typically displayed in a manner that permits a prospective purchaser to evaluate the operation and features of the merchandise, while protecting the merchandise from a potential thief. In one embodiment, a sensor may be attached to the article of merchandise for detecting various alarming conditions, such as the article being removed from the sensor. In some embodiments, the security devices may be similar to PODs manufactured by InVue Security Products Inc. (e.g., Series 950, 1000, and 2000 PODs).

Figure 1:
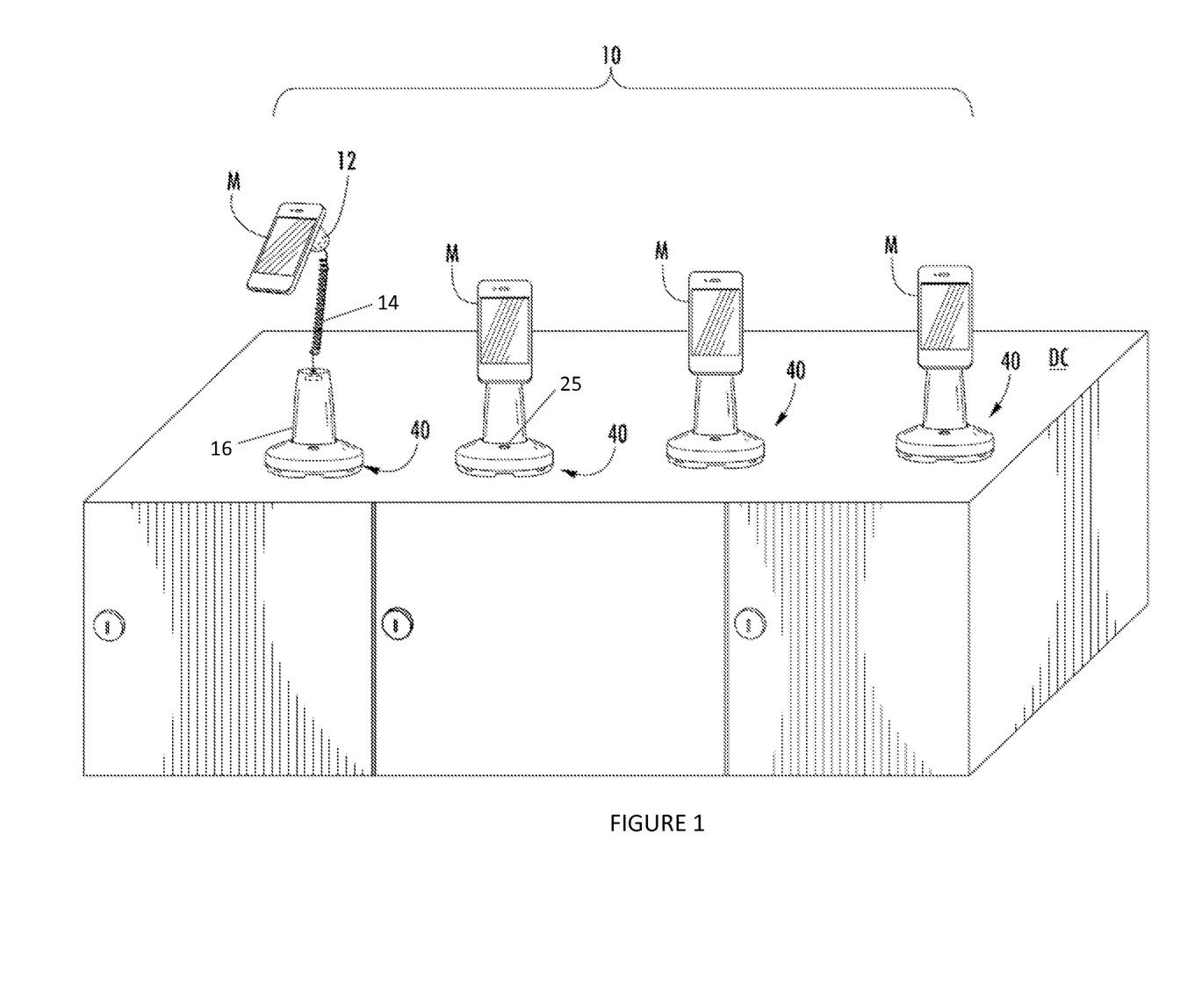
FIG. 1 illustrates a merchandise security system according to one embodiment of the present invention.
Figure 2:
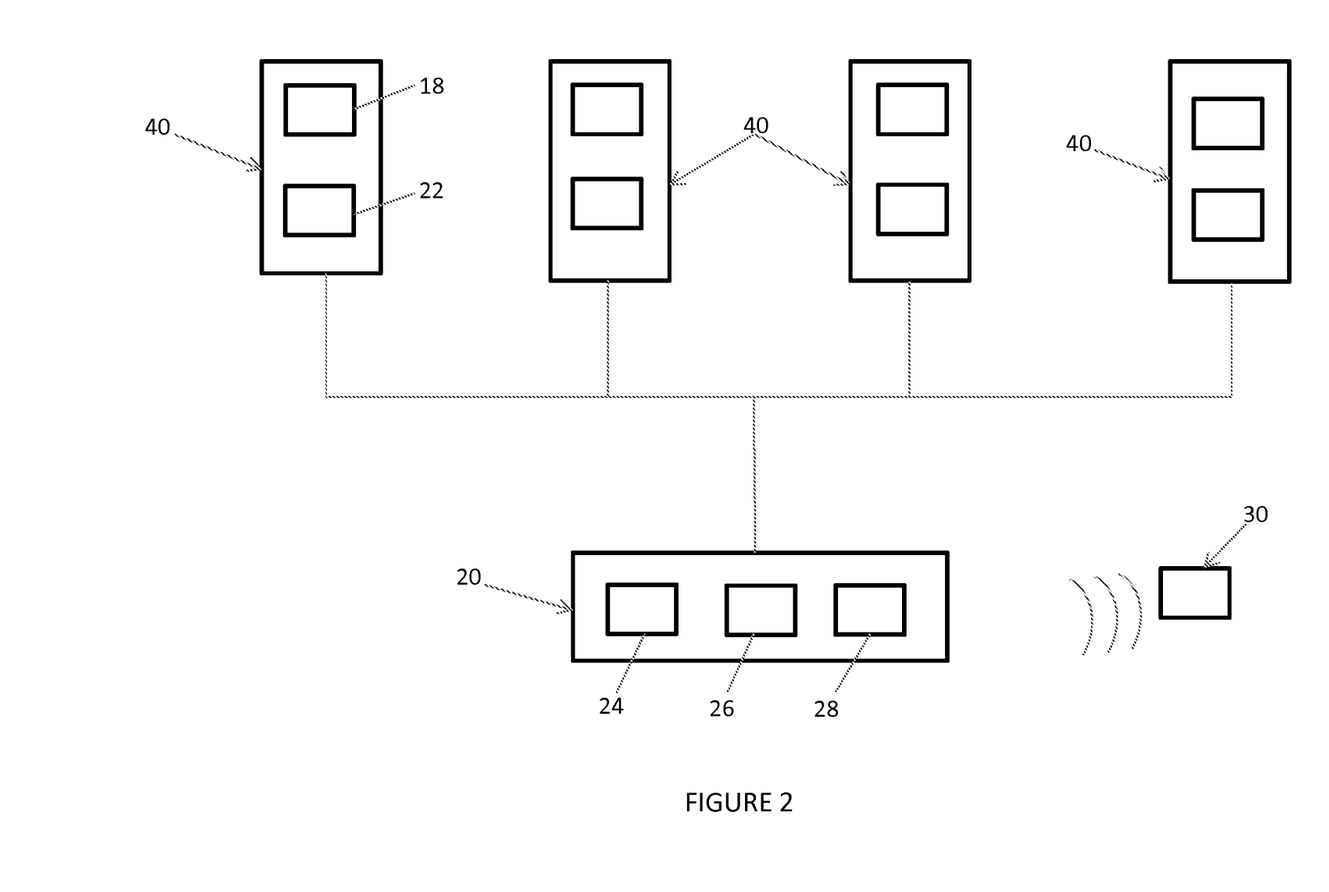
FIG. 2 is a schematic of a merchandise security system according to another embodiment of the present invention.

FIG. 1 illustrates an embodiment of a merchandise security system 10 for securing articles of merchandise M from theft or unauthorized removal. The system 10 generally includes one or more display positions, wherein each display position includes a security device 40 that is supported on a display counter "DC" (e.g., a counter, shelf, support, or the like). A security device 40 may generally include a sensor 12, a tether 14, and a base 16, although other arrangements may be contemplated (e.g., omitting the tether). The sensor 12 is configured to be secured to the article of merchandise M, such as with a pressure-sensitive adhesive. The sensor 12 is electrically connected to the tether 14, such as with a connector or via hardwiring. One end of the tether 14 may be electrically connected to the base 16, while the opposite end of the tether may be electrically connected to the sensor 12. The tether 14 and/or base 16 may be electrically connected to or otherwise in electrical communication with a controller 20, as explained in further detail below. In some embodiments, the tether 14 is electrically connected to a recoiler to allow the tether to extend and retract relative thereto. The recoiler may in turn be electrically connected to the controller 20. Although four security devices are shown in FIGS. 1 and 2, it is understood that the controller 20 may be configured to communicate with any number of security devices, including one or more. Moreover, in some embodiments, one or more controllers 20 may be employed. In some embodiments, the controller 20 and the security devices 40 are independent of one another such that the controller may be positioned remotely from the security devices (e.g., under the display counter).

The base 16 is configured to removably support the sensor 12 thereon such that the sensor and article of merchandise may be removed from the base for inspection and returned to the base. The base 16 may define an opening therethrough that allows the tether 14 to extend and retract relative to the base. It is understood that although a tethered embodiment is shown, it is understood that "tetherless" embodiments may also be utilized such as where the base 16 and the sensor 12 communicate wirelessly. For example, the base 16 and the sensor 12 may be configured to communicate wirelessly in order to ensure that the article of merchandise M is maintained within a predetermined location or distance relative to the base. In other embodiments, the article of merchandise M may be configured to be removably supported directly on the base 16 such that the sensor 12 may be integrated into the article. One example of wireless technology is disclosed in U.S. application Ser. No. 13/474,862, entitled Systems and Methods for Protecting Retail Display Merchandise From Theft, the contents of which are hereby incorporated by reference in their entirety herein.

In some embodiments, the sensor 12 and/or base 16 may include alarming circuitry 18 or the like that is configured to determine whether various security events have occurred for generating an audible and/or a visual alarm or signal (see, e.g., FIG. 2). The sensor 12 and/or base 16 may also include an alarm 22 (e.g., a piezoelectric device) that is configured to generate an audible alarm or signal. In some cases, the sensor 12 and/or base 16 may include a visual indicator (e.g., an LED) for emitting a visual signal when the alarming circuitry 18 is armed and/or alarming. Moreover, the sensor 12 and/or base 16 may include a transfer port 25 that is configured to communicate with a key for arming and/or disarming the alarming circuitry 18 (see, e.g., FIG. 1). In one embodiment, the transfer port 25 is configured to communicate wirelessly with a key in order to determine whether the key is authorized to arm and/or disarm the alarming circuitry 18. According to some embodiments, the key is similar to that described in U.S. Pat. No. 7,737,845, the contents of which are hereby incorporated by reference in their entirety herein. According to one embodiment, the sensor 12 may include a pressure switch or the like that is configured to detect when the article of merchandise M has been removed from the sensor. The alarming circuitry 18 may be configured to detect the removal of the article of merchandise M and/or cutting of the tether 14 and generate an audible and/or a visual alarm in response thereto.

The controller 20 may include a processor 24, CPU, or the like that is configured to facilitate communication with each of the security devices 40, both individually and collectively. For example, the controller 20 may be a digital interface box ("DIB") or a power interface box ("PIB") in some embodiments. The controller 20 may include communications circuitry 26 that is configured to transmit and receive signals and data from each of the security devices 40. The controller 20 may also include a memory 28 for storing various data regarding each of the articles of merchandise M and the security devices 40, as explained in further detail below. In one embodiment, the controller 20 is electrically connected to each of the security devices 40 via "wired" means, such as one or more electrical conductors. The controller 20 may be configured to transmit power to each of the security devices 40 and the articles of merchandise M via the electrical conductors. In other embodiments, the controller 20 and the security devices 40 may be configured to communicate with one another wirelessly. In order to provide power to the security devices 40, the security devices may utilize wireless power functionality, such as contact or inductive charging technology. In addition, the controller 20 may be configured to transmit and/or regulate the voltage provided to each of the security devices 40 and/or articles of merchandise M. For example, the controller 20 may be in electrical communication with an input power source and configured to transmit power at the appropriate voltage to each of the security devices 40 and the articles of merchandise M.

The controller 20 may also be configured to communicate wirelessly with a remote device 30. However, it is understood that other communication techniques may be used between the controller 20 and the remote device 30, including wired communication (e.g., via one or more electrical conductors). According to various embodiments, the remote device 30 could be a handheld device (e.g., a cellular phone, tablet, or smart phone), a key, or other computing device (e.g., a computer). The remote device 30 may be configured to communicate with the controller 20 in order to perform various functions. For instance, the remote device 30 may be configured to transmit a signal to the controller 20 to lock down each of the security devices 40 such that the article of merchandise M and the sensor 12 may be not be removed from the base 16. In some embodiments, the remote device 30 may also be configured to communicate directly with one or more of the security devices 40 for performing similar functionality. Thus, one or more security devices 40 may include similar communications circuitry as that of the controller 20.

Figure 3:
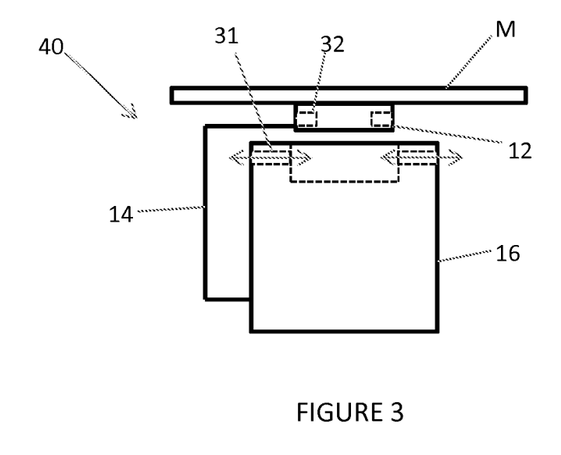
FIG. 3 is schematic of a security device according to an embodiment of the present invention.

Such a lock down could be carried out using various locking mechanisms that are configured to operably engage the article of merchandise M such that the article of merchandise cannot be removed from the base 16. In one example, the locking mechanism is an electromechanical locking mechanism that is configured to be actuated in response to a signal provided by the controller to each security device. In one embodiment, FIG. 3 shows a base 16 including one or more engagement members 31 that are configured to extend and retract (as shown by the illustrated arrows) to engage respective openings 32 defined in the sensor 12 when the sensor is resting on the base. Alternatively, the sensor 12 could include one or more engagement members for engaging the base 16, or the base may be configured to engage the article of merchandise M (e.g., with a clamp mechanism or one or more locking arms).

It is understood that any desired type of locking mechanism could be utilized, whether implementing mechanical, electrical, and/or magnetic means. For example, in some embodiments, a shape memory material (e.g., Nitinol) may be used in connection with a locking mechanism. For example, electrical power provided by the remote device 30 may be transferred to the locking mechanism for causing a change in shape in the shape memory material (e.g., a change in length), thereby actuating a mechanical lock mechanism. In one example, where a shape memory material is utilized, a change in shape of the shape memory material may cause mechanical actuation (e.g., linear and/or rotary movement) of the locking mechanism. The shape memory material may be operably engaged with a locking mechanism in any number of configurations to facilitate such actuation. Moreover, the shape memory material may be any suitable material, such as a metal, a polymer, or a combination thereof, that is configured to change its shape (e.g., length, area, etc.) in response to an electric current or a change in temperature and to return to its original shape after the electric current is no longer transferred therethrough. For example, transferring current through the shape memory material may cause the material to be heated and thereby contract. Upon removal of the current, the shape memory material may return to its original shape. In some embodiments, the locking mechanism may utilize shape memory material and be similar to that disclosed in in U.S. application Ser. No. 14/328,051, entitled Merchandise Security Devices for Use with an Electronic Key, the contents of which are hereby incorporated by reference in their entirety herein.

Thus, the sensor 12 may be physically locked to the base 16 via the locking mechanism, or in the instance where a recoiler is used, the recoiler may be physically locked to prevent the tether from being extended therefrom. Furthermore, the remote device 30 may include software or an application that allows a user to select particular security functions, data, security devices 40, and/or articles of merchandise M for controlling and/or communicating therewith.

In some embodiments, the remote device 30 is configured to communicate with the controller 20 to simultaneously lock down each of the security devices 40. In addition or alternatively, the remote device 30 may be configured to communicate with the controller 20 and each security device 40 selectively. For example, the remote device 30 may provide a signal to the controller 20 to only lock down a specific security device 40 while the remaining security devices remain available for inspection by a consumer. Thus, the remote device 30 may be configured to select specific security devices 40 or articles of merchandise M, which may be indicated by a particular display position or other identifier.

Advantageously, the remote device 30 may be configured to communicate with the controller 20 from any desired location. In this regard, a sales associate with access to a remote device 30 may activate the remote device at any location in a retail environment, such as a department store. This may be beneficial for a retailer since all security devices 40 may be armed, disarmed, locked, or unlocked collectively rather than on an individual basis. Such collective communication could also be useful when an emergency or potential theft occurs so that a retailer may be able to act quickly. It may also be useful for a retailer when closing a store or at night when the retailer wishes to lock down security devices 40. Although described for use in a retail environment, it is evident that remote communication for performing various security functions may be useful in other environments where electrical articles are utilized (e.g., a restaurant, a hospital, etc.). In one embodiment, the remote device 30 may be configured to communicate over a cellular network in order to communicate with the controller 20 for performing various functions. Thus, the remote device 30 may be configured to communicate from locations that are remote from the security devices 40 (e.g., ranging from within a store to several miles away). Accordingly, the remote device 30 may be configured to communicate "remotely" in that the remote device 30 and the controller 20 do not need to be in proximity with one another or in physical engagement with one another in order to communicate with one another. However, in some cases, the remote device 30 may be configured for communication in close proximity to a security device 40 and/or the controller 20, which may be used to lock one or more security devices. For example, the security device 40 and/or controller may include means for facilitating communication with the remote device 30 when the remote device is positioned proximate to, adjacent to, or in contact with the security device or the controller. It is understood that the remote device 30 and the controller 20 may communicate with any desired means, such as cellular networks, Wi-Fi, Bluetooth communication, and the like. The controller 20 and/or the remote device 40 may include communications circuitry or a transceiver that is configured to facilitate such communication with one another.

According to another embodiment, each security device 40 may include a transfer port 25 or communications circuit that facilitates communication with a remote device 30. Thus, a remote device 30 could be configured to communicate with individual security devices 40 to perform various functions (e.g., locking the sensor 12 to the base 16 or locking the recoiler). In addition, the alarming circuitry 18 may be configured to generate an alarm in response to removal of the sensor 12 from the base 16 during a locked state. Such removal could be detected using various sensors, such as a proximity or an optical switch.

Furthermore, the remote device 30 may be configured to request various data regarding a security device 40 and/or an article of merchandise M. For example, the controller 20 may be configured to collect and store various information regarding the article of merchandise M, such as, the number of "pulls" or "pickups" of a particular article of merchandise, the type of article, the location of the article, etc. Thus, a user could use a remote device 30 to request information regarding a specific article of merchandise M by communicating with the controller 20. Additional examples of types of data that may be collected in response to interaction with the article of merchandise may be found, for example, in U.S. application Ser. No. 13/856,664, entitled Merchandise User Tracking System and Method, the contents of which are hereby incorporated by reference in their entirety herein.

If desired, the controller 20 may also be electrically connected to an optional auxiliary component, such as a digital media system for providing advertising content to, and/or for obtaining customer interaction data from, one or more of the security devices 40. For example, the controller 20 may be in communication with a media player for providing optional media content related to the article of merchandise M. In some embodiments, the controller is configured to operate in conjunction with a digital signage system as known to those skilled in the art.

Many modifications and other embodiments of the invention will be readily apparent to one skilled in the art having the benefit of the teachings presented in the foregoing descriptions and the associated drawings. Therefore, it is understood and appreciated that the invention is not to be limited to the specific embodiments disclosed herein, and that modifications to the disclosed embodiments and other undisclosed embodiments are intended to be included within the scope of the appended claims.

That which is claimed is:

1. A merchandise security system comprising:
   a plurality of security devices, each of the security devices comprising a sensor configured to be attached to an article of merchandise and further comprising a base for removably supporting the sensor and the article of merchandise thereon, wherein each of the security devices further comprises a tether connected to the sensor at one end of the tether and connected to the base at an opposite end of the tether, each sensor and a respective article of merchandise attached thereto configured to be removed from a respective base for inspection and returned to a rested position on the base for display;
   alarming circuitry configured to detect removal of a sensor from a respective article of merchandise attached thereto;
   a remote device configured to communicate with each of the plurality of security devices, the remote device comprising software configured to allow a user to select particular security functions and security devices for controlling the selected security devices; and
   a controller in communication with each of the security devices,
   wherein the controller is configured to communicate with the remote device to lock at least one of the security devices such that the sensor and the article of merchandise attached thereto cannot be removed from the base in the rested position, wherein each of the security devices comprises a locking mechanism disposed within a respective base configured to engage the sensor such that the sensor is locked to the base, and wherein the controller is configured to communicate with the remote device for actuating at least one of the locking mechanisms such that the article of merchandise cannot be removed from the base.

2. The merchandise security system of claim 1, wherein the controller is a digital interface box.

3. The merchandise security system of claim 1, wherein the controller is configured to provide electrical power to each of the security devices and the articles of merchandise.

4. The merchandise security system of claim 1, wherein each sensor and/or each base comprises alarming circuitry for generating an audible and/or a visual signal in response to removal of the article of merchandise from the sensor.

5. The merchandise security system of claim 1, wherein the locking mechanism is configured to prevent the tether from being extended relative to the base when the security device is locked.

6. The merchandise security system of claim 1, wherein the controller is configured to wirelessly communicate with the remote device.

7. The merchandise security system of claim 1, wherein the remote device is configured to communicate with the controller.

8. The merchandise security system of claim 1, wherein the remote device is a cellular device or a key.

9. The merchandise security system of claim 7, wherein the remote device is configured to request data from the controller regarding at least one of the security devices.

10. The merchandise security system of claim 7, wherein the remote device is configured to communicate with the controller to lock each of the security devices simultaneously.

11. The merchandise security system of claim 7, wherein the remote device is configured to communicate with the controller to selectively lock one of the security devices.

12. A method for displaying and securing articles of merchandise, the method comprising:
    communicating with a plurality of security devices via a remote device, each of the security devices comprising a sensor configured to be attached to an article of merchandise and further comprising a base for removably supporting the sensor and the article of merchandise thereon, wherein each of the security devices further comprises a tether connected to the sensor at one end of the tether and connected to the base at an opposite end of the tether, each sensor and a respective article of merchandise attached thereto configured to be removed from a respective base for inspection and returned to a rested position on the base for display; and
    locking at least one of the security devices in response to a remote signal received from the remote device such that sensor and the article of merchandise attached thereto cannot be removed from the base in the rested position, wherein locking comprises actuating a locking mechanism disposed within the base to physically engage the base and the sensor.

13. The method of claim 12, wherein receiving comprises receiving the remote signal over a cellular network.

14. The method of claim 12, wherein locking comprises locking each of the security devices simultaneously.

15. The method of claim 12, wherein locking comprises selectively locking one of the security devices.

16. The method of claim 12, wherein receiving comprises receiving a wireless remote signal from a remote device.

17. A merchandise security system comprising:
    a plurality of security devices, each of the security devices comprising a sensor configured to be attached to an article of merchandise and further comprising a base for removably supporting the sensor and the article of merchandise thereon, wherein each of the security devices further comprises a tether connected to the sensor at one end of the tether and connected to the base at an opposite end of the tether, each sensor and a respective article of merchandise attached thereto configured to be removed from a respective base for inspection and returned to a rested position on the base for display;
    a remote device configured to communicate with the plurality of security devices; and
    alarming circuitry configured to detect removal of a sensor from a respective article of merchandise attached thereto,
    wherein each of the plurality of security devices comprises a locking mechanism,
    wherein each locking mechanism is disposed within a respective base and is configured to be actuated in response to a signal from the remote device to lock the sensor to the base such that the sensor and the article of merchandise attached thereto cannot be removed from the base in the rested position, wherein the base is configured to receive a portion of the sensor therein, and wherein the locking mechanism of each of the plurality of security devices comprises at least one engagement member configured to engage the sensor to physically lock the sensor to the base in the rested position.

18. The merchandise security system of claim 17, wherein each sensor and/or each base comprises alarming circuitry for generating an audible and/or a visual signal in response to removal of the article of merchandise from the sensor.

19. The merchandise security system of claim 17, wherein the locking mechanism of each of the plurality of security devices is configured to be locked using a key.

20. The merchandise security system of claim 17, wherein the locking mechanism is configured to prevent the tether from being extended relative to the base when the security device is locked.

21. The merchandise security system of claim 20, wherein each of the plurality of security devices further comprises a recoiler connected to the tether and configured to allow the tether to extend and retract relative to the base, the locking mechanism configured to prevent the tether from being extended therefrom.

22. The merchandise security system of claim 17, wherein the remote device is configured to request data regarding at least one of the plurality of security devices.

23. The merchandise security system of claim 17, wherein the remote device is configured to request data regarding at least one of the articles of merchandise.

24. The merchandise security system of claim 23, wherein the data comprises a type of the article of merchandise.

25. The merchandise security system of claim 17, wherein the remote device is a remote computing device configured to request data regarding at least one of the plurality of security devices and at least one of the articles of merchandise.

26. The merchandise security system of claim 17, wherein the remote device is configured to arm, disarm, lock, or unlock each of the plurality of security devices.

27. The merchandise security system of claim 17, wherein the remote device is configured to arm or disarm each of the plurality of security devices.

28. The merchandise security system of claim 17, wherein the remote device is configured to lock or unlock each of the plurality of security devices.

29. The merchandise security system of claim 17, wherein the remote device is a computer.

30. The merchandise security system of claim 29, wherein the computer is configured to wirelessly communicate with each of the plurality of security devices.

31. The merchandise security system of claim 17, further comprising a key configured to communicate with any one of the plurality of security devices to arm or disarm the alarming circuitry.

32. The merchandise security system of claim 17, wherein the remote device comprises software configured to allow a user to select particular articles of merchandise for controlling and/or communicating therewith.

33. The merchandise security system of claim 17, wherein the remote device comprises software configured to allow a user to select particular articles of merchandise for controlling the selected articles of merchandise.

34. The merchandise security system of claim 17, wherein the remote device comprises software configured to allow a user to select any one of plurality of security devices for controlling the selected security device.

35. The merchandise security system of claim 17, wherein the remote device is configured to communicate directly with one or more of the plurality of security devices.

36. The merchandise security system of claim 17, further comprising a controller, wherein the controller is configured to wirelessly communicate with each of the plurality of security devices, and wherein the remote device is configured to wirelessly communicate with the controller for controlling one or more of the plurality of security devices.

37. The merchandise security system of claim 17, wherein the remote device comprises software configured to allow a user to select any one of plurality of security devices for communicating therewith.

38. The merchandise security system of claim 1, wherein the remote device is a computer.

39. The merchandise security system of claim 1, wherein the remote device is configured to communicate directly with one or more of the plurality of security devices for controlling the security devices.

40. The merchandise security system of claim 1, wherein the remote device comprises software configured to allow a user to select particular articles of merchandise for controlling and/or communicating therewith.

41. The merchandise security system of claim 1, wherein the remote device comprises software configured to allow a user to select particular articles of merchandise for controlling and communicating therewith.

42. The merchandise security system of claim 1, wherein the remote device comprises software configured to allow a user to select any one of plurality of security devices for communicating therewith.

43. The merchandise security system of claim 17, wherein the remote device is configured to obtain data regarding a location of each of the plurality of articles of merchandise.

44. The merchandise security system of claim 17, wherein the remote device comprises software configured to allow a user to select particular security functions and security devices for controlling the selected security devices.

45. The merchandise security system of claim 17, wherein the remote device is configured to communicate with each of the plurality of security devices to lock each of the security devices simultaneously.

46. The merchandise security system of claim 17, wherein the remote device is a cellular device.

47. A merchandise security system comprising:
a plurality of security devices, each of the security devices comprising a sensor configured to be attached to an article of merchandise and further comprising a base for removably supporting the sensor and the article of merchandise thereon, wherein each of the security devices further comprises a tether connected to the sensor at one end of the tether and connected to the base at an opposite end of the tether, each sensor and a respective article of merchandise attached thereto configured to be removed from a respective base for inspection and returned to a rested position on the base for display;
a remote device configured to communicate with the plurality of security devices; and
alarming circuitry configured to detect removal of a sensor from a respective article of merchandise attached thereto,
wherein each of the plurality of security devices comprises a locking mechanism,
wherein each locking mechanism is disposed within a respective base and is configured to be actuated in response to a signal from the remote device to lock the sensor to the base such that the sensor and the article of merchandise attached thereto cannot be removed from the base in the rested position, wherein each of the plurality of security devices further comprises a recoiler connected to the tether and configured to allow the tether to extend and retract relative to the base, the locking mechanism configured to physically lock the recoiler to prevent the tether from being extended therefrom and to thereby lock the sensor to the base in the rested position.

48. The merchandise security system of claim 47, wherein the locking mechanism of each of the plurality of security devices is configured to be locked using a key.

49. The merchandise security system of claim 47, wherein the remote device is configured to request data regarding at least one of the plurality of security devices.

50. The merchandise security system of claim 47, wherein the remote device is configured to request data regarding at least one of the articles of merchandise.

51. The merchandise security system of claim 50, wherein the data comprises a type of the article of merchandise.

52. The merchandise security system of claim 47, wherein the remote device is a remote computing device configured to request data regarding at least one of the plurality of security devices and at least one of the articles of merchandise.

53. The merchandise security system of claim 47, wherein the remote device is configured to arm or disarm each of the plurality of security devices.

54. The merchandise security system of claim 47, wherein the remote device is configured to lock or unlock each of the plurality of security devices.

55. The merchandise security system of claim 47, wherein the remote device is a computer.

56. The merchandise security system of claim 55, wherein the computer is configured to wirelessly communicate with each of the plurality of security devices.

57. The merchandise security system of claim 47, further comprising a key configured to communicate with any one of the plurality of security devices to arm or disarm the alarming circuitry.

58. The merchandise security system of claim 47, wherein the remote device comprises software configured to allow a user to select particular articles of merchandise for communicating therewith.

59. The merchandise security system of claim 47, wherein the remote device comprises software configured to allow a user to select particular articles of merchandise for controlling the selected articles of merchandise.

60. The merchandise security system of claim 47, wherein the remote device comprises software configured to allow a user to select any one of plurality of security devices for controlling the selected security device.

61. The merchandise security system of claim 47, wherein the remote device is configured to communicate directly with one or more of the plurality of security devices.

62. The merchandise security system of claim 47, further comprising a controller, wherein the controller is configured to wirelessly communicate with each of the plurality of security devices, and wherein the remote device is configured to wirelessly communicate with the controller for controlling one or more of the plurality of security devices.

63. The merchandise security system of claim 47, wherein the remote device comprises software configured to allow a user to select any one of plurality of security devices for communicating therewith.

64. The merchandise security system of claim 47, wherein the remote device is configured to obtain data regarding a location of each of the plurality of articles of merchandise.

65. The merchandise security system of claim 47, wherein the remote device comprises software configured to allow a user to select particular security functions and security devices for controlling the selected security devices.

66. The merchandise security system of claim 47, wherein the remote device is configured to communicate with each of the plurality of security devices to lock each of the security devices simultaneously.

* * * * *

UNITED STATES PATENT AND TRADEMARK OFFICE
CERTIFICATE OF CORRECTION

PATENT NO. : 10,803,718 B2
APPLICATION NO. : 15/112230
DATED : October 13, 2020
INVENTOR(S) : James K. Sankey Page 1 of 1

It is certified that error appears in the above-identified patent and that said Letters Patent is hereby corrected as shown below:

On the Title Page

Item (73), please delete the Assignee "Huawai Technologies Co., Ltd, Shenzhen (CN)" and replace it with "InVue Security Products Inc., Charlotte, NC (US)".

Item (74), please delete the Attorney, Agent, or Firm "Slater Matsil, LLP" and replace it with "InVue Security Products Inc.".

Signed and Sealed this
Thirteenth Day of April, 2021

Drew Hirshfeld
*Performing the Functions and Duties of the
Under Secretary of Commerce for Intellectual Property and
Director of the United States Patent and Trademark Office*